Jan. 11, 1949.  H. L. HARRIS  2,458,941
SPRING WHEEL
Filed July 22, 1946  2 Sheets-Sheet 1
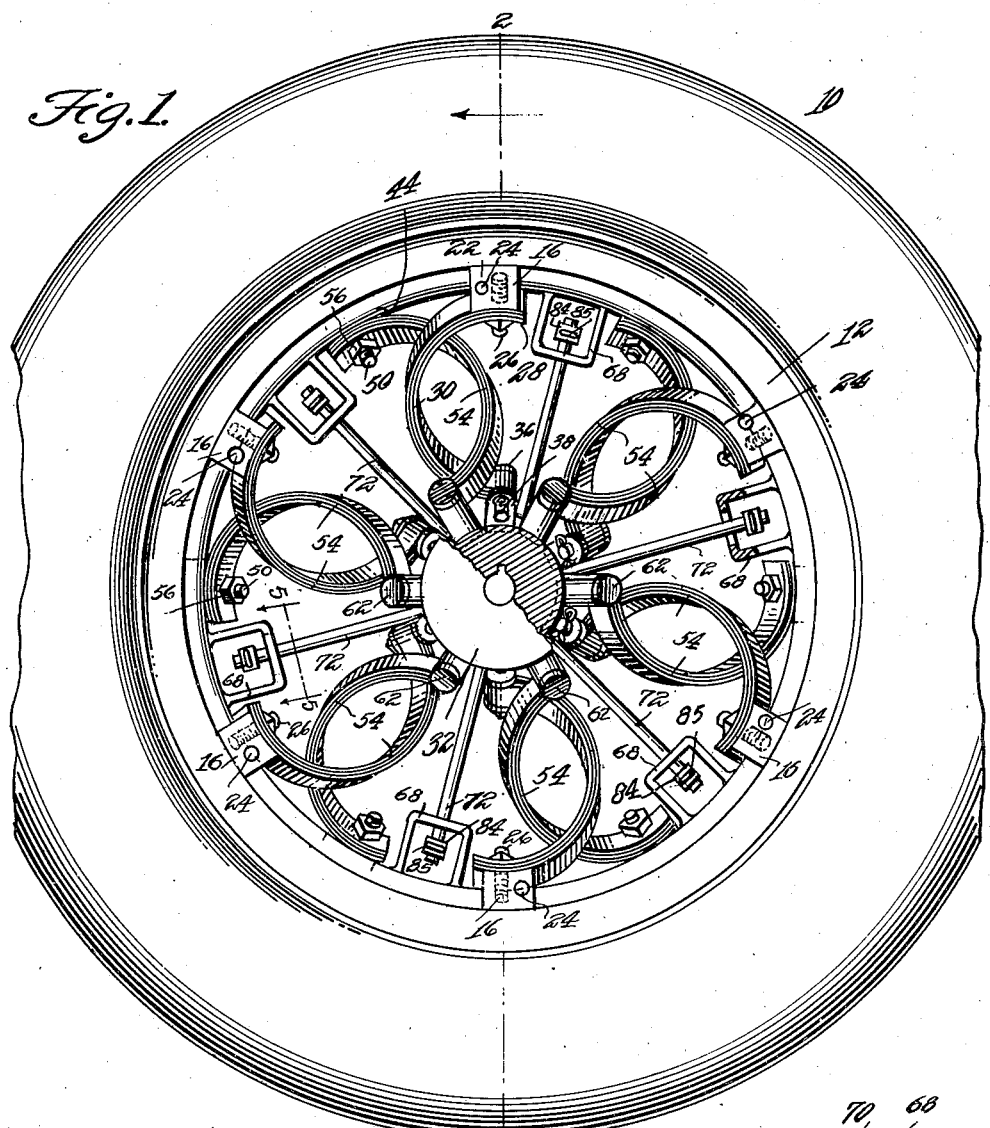
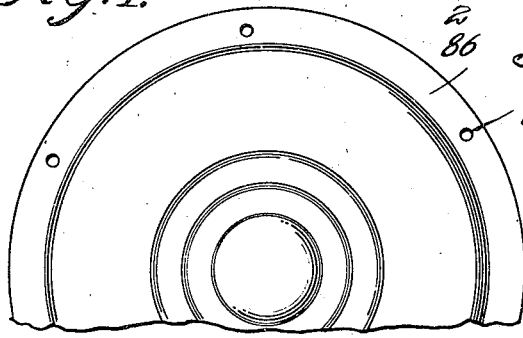
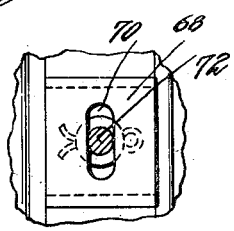
INVENTOR.
Henry L. Harris.
BY Victor J. Evans & Co.
ATTORNEYS

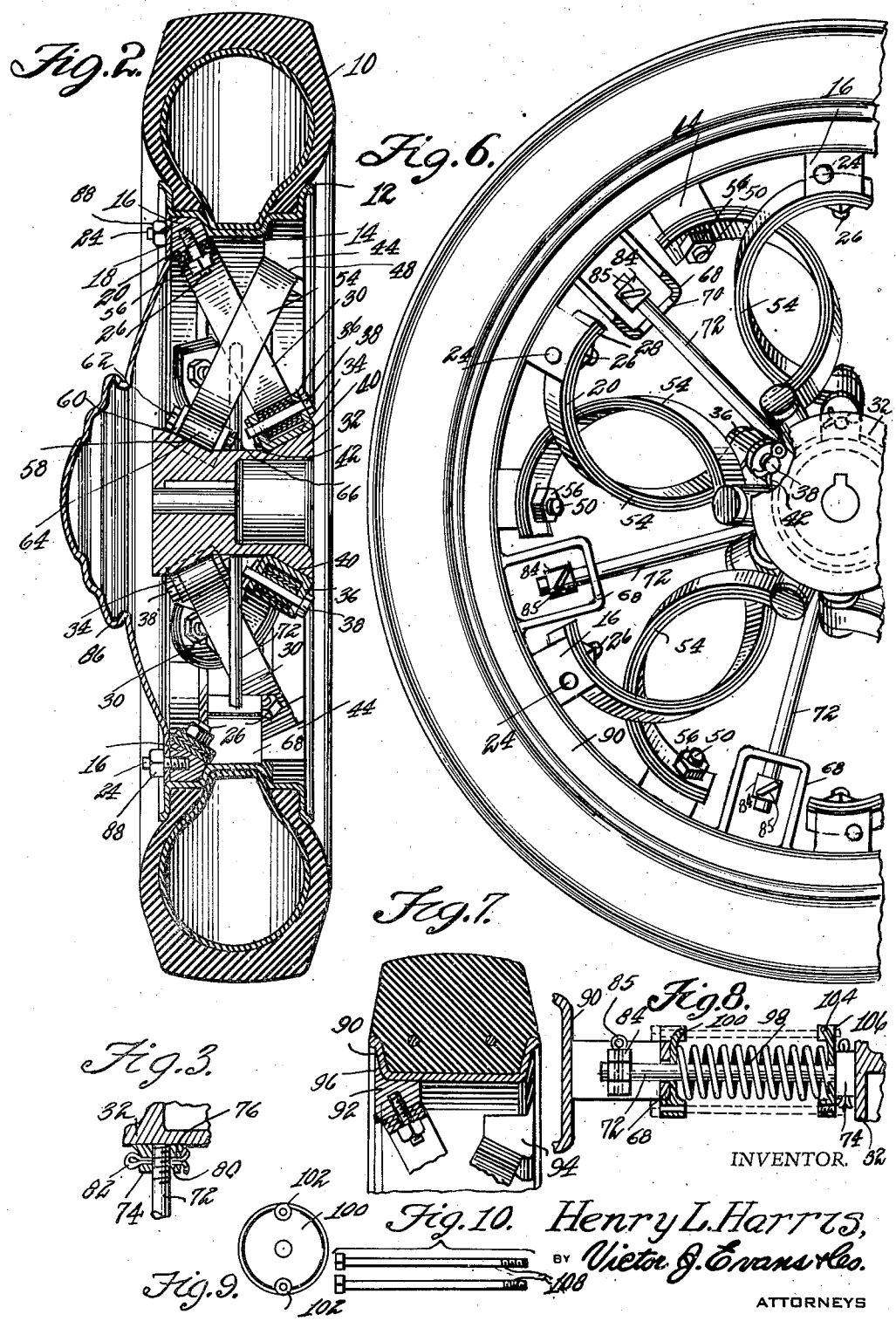

Patented Jan. 11, 1949

2,458,941

UNITED STATES PATENT OFFICE 2,458,941

SPRING WHEEL

Henry Levene Harris, Richland, Wash.

Application July 22, 1946, Serial No. 685,507

5 Claims. (Cl. 152—84)

This invention relates to a spring wheel for a motor vehicle that is adapted for use with rubber tires either pneumatic or solid.

An object of this invention is to provide a spring wheel that can be used for all types and sizes of vehicles and will not differ in any extent in outside appearance from the conventional type of wheel in use at the present time.

Another object of the invention is to provide a spring wheel that will afford smooth and easy riding qualities of and with solid tires as the present day wheel affords with the use of pneumatic tires.

With these and other objects and advantages in view, the invention consists of the novel details of construction, arrangement and combination of parts more fully hereinafter described, claimed and illustrated in the accompanying drawings, in which:

Figure 1 is a side view of an embodiment of the invention in use with a pneumatic tire;

Figure 2 is a vertical sectional view on the line 2—2 of Figure 1 with the cover attached;

Figure 3 is an enlarged fragmentary detail view showing the manner in which the spoke is attached to the hub;

Figure 4 is a fragmentary view of the cover for the wheel;

Figure 5 is an enlarged view on the line 5—5 of Figure 1;

Figure 6 is a side view of the invention as applied to a solid tire;

Figure 7 is a fragmentary sectional view of solid tire and wheel,

Figure 8 is a modification of the invention as applied to the spokes thereof;

Figure 9 is an elevational view of one of the disc washers shown in the modified form in Figure 8 and Figure 10 shows the spring releasing rods.

Referring more in detail to the drawing, the reference numeral 10 designates a pneumatic tire which is mounted on a drop center rim 12, having the conventional annular well or drop center 14.

Fastened to the rim 12 by welding or the like are relatively spaced block members 16 which are secured at the top to the rim 12 and at the inner side thereof to the well or drop center 14. Each block 16 is provided with an internally threaded bore 18 which extends through the angularly inclined base 20 of the block towards the opposite side of the rim, the bore 18 is at right angular relationship with the base 20. The face 22 of the block 16 is provided with externally studs 24, the use of which will be later explained.

Topped into the base 20 of the blocks 16 are threaded studs 26, which are adapted to receive the apertured ends 28 of the semi-circular leaf springs 30. The inclination of the springs 30 are the same as the bases 20 so that the springs are connected to the inner end of the hub 32. The hub 32 is provided with a conical inner end 34 and U-shaped brackets 36 are welded thereto in relatively spaced relation to each other and equal in number, the blocks 16 fastened to the outer edge of the rim 12. A bolt 38 enters the rolled end 40 of the springs 30 and the aligned openings in the brackets and is retained in position in the brackets 36 by a cotter key 42.

Secured to the inner side of the rim 12 in like manner as are the blocks 16 are the block members 44 which are similar to the blocks 16 having the angular bores 46 and inclined base 48. Threaded studs 50 topped in the bores 46 receive the apertured ends 52 of the semi-circular leaf springs 54 and both sets of springs have their apertured ends retained in position by nuts 56.

The inclination of the springs is the same as the bores 46 so that the springs are connected to the outer end of the hub 32.

The hub 32 is provided with a similar conical outer end 58 to the inner end 34 and U-shaped brackets 60 welded to the end 58 in relatively spaced relation to each other and equal in number the blocks 44 are fastened to the inner edge of the rim 12. The blocks 44 and brackets 60 are positioned on the rim 12 and hub 32 intermediate of the blocks 16 and brackets 36. A bolt 62 enters the rolled end 64 of the springs 54 and the aligned openings of the brackets 60 and is retained in position in the brackets 60 by a cotter key 66.

The springs 30 and 54 are when fastened to their respective block members so positioned that their ends face in opposite directions toward each other and the springs pass over each other forming a T-shaped formation as shown. Intermediate the ends of the springs 30 and 54 U-shaped brackets 68 are welded to the drop center 14. The base of the brackets being provided with an elongated slot 70 which is adapted to receive one end of a spoke 72, the other end of which is threaded into a nut 74 welded to the medial portion of the hub 32. The nut 74 and spoke 72 are provided with openings 76 and 80 respectively to receive a cotter key 82 which prevents rotation of the spoke 72, and a nut 84 is positioned on the end of the spoke 72 within the bracket 68 and is retained thereon by a cotter key 85.

A cover 86 simulating in appearance the conventional vehicle wheel is provided with openings 88 which are adapted to receive the studs 24 on the block 16 and the cover 86 is retained thereon by nuts 88.

In Figures 6 and 7, the construction is similar in respect to that previously described except that the rim 90 is not a drop center rim, but is adapted for use with a solid tire.

The blocks 92 and 94 are therefore provided with lips 96 which are welded to the outer and inner sides of the rim 90.

Positioned on the spoke 72 intermediately of the bracket 68 and spring 98 is a disc shaped circular washer 100 having smooth bored bosses 102 formed thereon in opposed relation to each other while at the opposite end of the spring 98 and intermediate the spring 98 and nut 74 is a similarly shaped washer 104 having internally threaded bosses 106 formed thereon in similar manner as are the bosses 102 on the washer 100.

Should it be necessary to remove the spring 98 which is under tension at all times the elongated bolts 108 are inserted in the smooth bored bosses 102 of the washer 100 and threadably engaged in the bosses 106 and upon tightening of the bolts 108 the spring will be compressed for the easy removal thereof after any necessary repair has been made, the springs are replaced, the bolts are removed and the wheel is again ready for operation.

In Figure 8, a coil spring 98 is positioned on the spoke 72 intermediate the bracket 68 and nut 74 and the spring aids in absorbing the rebound of the spoke and also aids in eliminating noise.

There is thus provided a spring wheel which by its construction permits full springing and provides spokes to prevent sidesway and damage to the individual leaf springs.

It is believed that the operation of the spring wheel will be apparent to those skilled in the art and it is to be understood that minor changes in the construction, combination and arrangement of parts may be resorted to without departing from the spirit of the invention or extending beyond the scope of the appended claims.

Having thus described the invention, what is claimed as new and desired to be secured by Letters Patent is:

1. A device of the character described, comprising a rim adapted to support a vehicle tire, blocks secured to the outer side of said rim, blocks secured to the inner side of said rim intermediate the blocks secured to the outer side thereof, a hub having conical shaped inner and outer ends and semi-circular springs which are in inclined interlaced relation to each other connecting said blocks and said hub to form a spring wheel.

2. The invention as described in claim 1 wherein spokes are provided intermediate the ends of said springs and are connected to said rim and said hub.

3. The invention as described in claim 1 wherein U-shaped brackets are provided on said hub for connecting said springs thereto.

4. The invention as described in claim 1 wherein means are provided on said rim and said hub for connecting spokes thereto.

5. The invention as described in claim 1 wherein means are provided on said blocks for securing a cover thereto.

HENRY LEVENE HARRIS.

REFERENCES CITED

The following references are of record in the file of this patent:

UNITED STATES PATENTS

| Number | Name | Date |
|--------|------|------|
| 994,297 | Arnold et al. | June 6, 1911 |
| 1,064,636 | Gibson | June 10, 1913 |
| 1,137,509 | Marley et al. | Apr. 27, 1915 |
| 1,207,340 | Stratton | Dec. 5, 1916 |
| 1,546,513 | Sipes | July 21, 1925 |